(No Model.)
F. H. STUBBE.
SANDPAPER WHEEL.
No. 505,683. Patented Sept. 26, 1893.
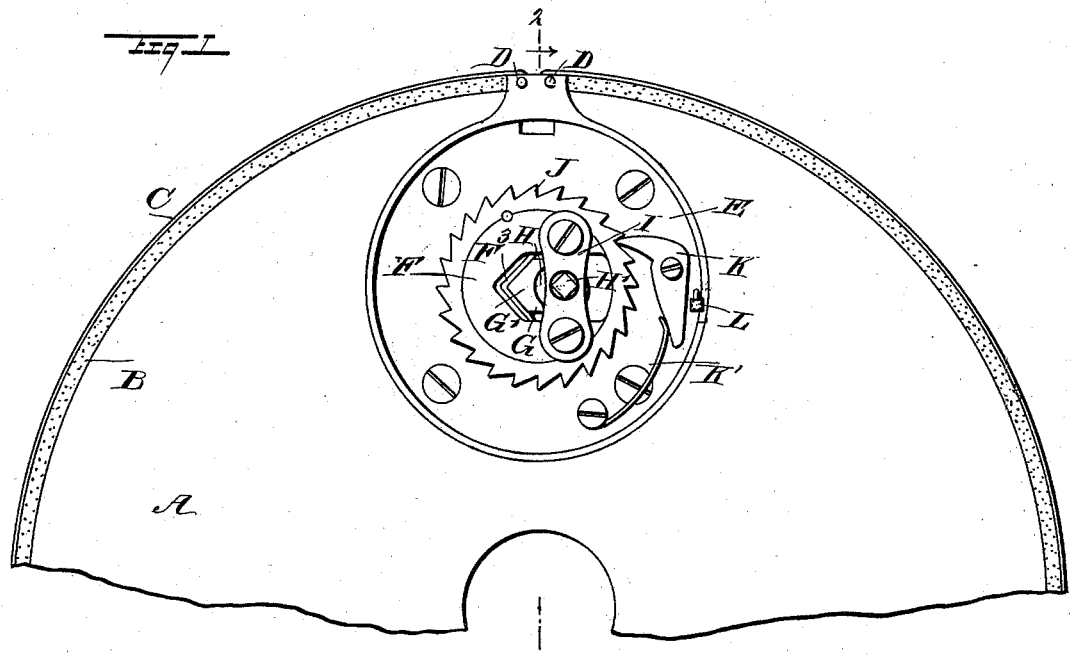
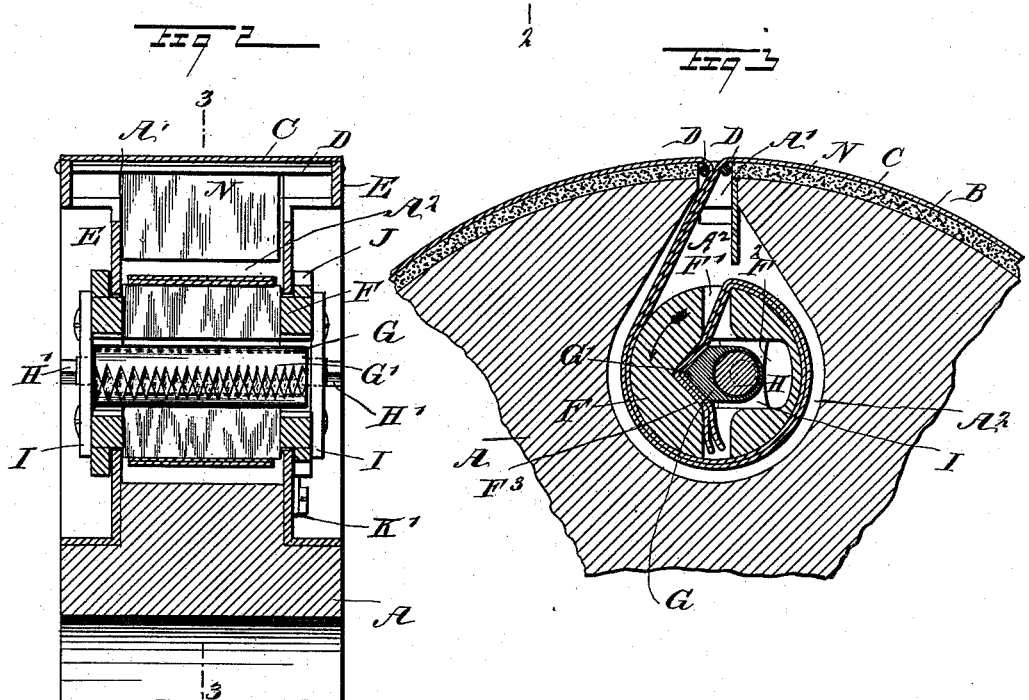
WITNESSES:
H. Walker
C. Sedgwick
INVENTOR
F. H. Stubbe
BY
Munn & Co.
ATTORNEYS.

UNITED STATES PATENT OFFICE.

FREDERICK H. STUBBE, OF NEW YORK, N. Y., ASSIGNOR OF ONE-HALF TO JOHN C. KLATZL, OF SAME PLACE.

SANDPAPER-WHEEL.

SPECIFICATION forming part of Letters Patent No. 505,683, dated September 26, 1893.

Application filed July 15, 1893. Serial No. 480,601. (No model.)

*To all whom it may concern:*

Be it known that I, FREDERICK H. STUBBE, of the city, county, and State of New York, have invented a new and Improved Sandpaper-Wheel, of which the following is a full, clear, and exact description.

The object of the invention is to provide a new and improved sand-paper wheel, which is simple and durable in construction, very effective in operation, and arranged to draw the sheet of sand-paper or other material upon the peripheral surface of the roll and lock it in place thereon.

The invention consists of certain parts and details and combinations of the same, as will be hereinafter described and then pointed out in the claims.

Reference is to be had to the accompanying drawings forming a part of this specification, in which similar letters of reference indicate corresponding parts in all the figures.

Figure 1 is a side elevation of the improvement. Fig. 2 is a transverse section of the same on the line 2—2 of Fig. 1; and Fig. 3 is a sectional side elevation of the same on the line 3—3 of Fig. 2.

The wheel A, is covered on its peripheral surface by a suitable elastic material B, upon which is drawn the sand-paper C, which extends at its ends through a slot A' into a recess $A^2$ formed in the web of the wheel A. The ends of the sand-paper, in passing into the slot A', pass over two transversely-extending rods or rollers D, fixed in disks E fastened by screws, or other suitable means, to opposite sides of the web of the wheel A, to cover the recess $A^2$, as will be readily understood by reference to Figs. 2 and 3.

Through the recess $A^2$ extends transversely a spindle F journaled at its ends in the disks E, the said spindle being provided inside of the recess $A^2$ with a diametrical slot F' leading to a recess or a guideway $F^2$ formed within the spindle, as plainly shown in Fig. 3. The forward end of this recess or guideway $F^2$ is made V-shape, as at $F^3$, and into it extends the correspondingly shaped point G' of a clamping bar G fitted in the recess $F^2$ and adapted to press or clamp the ends of the paper against the walls of the V-shaped end $F^3$ of the recess $F^2$. The point G' is preferably serrated, as indicated in Fig. 2.

In the bar G is formed a transversely-extending bore engaged by an eccentric H formed or secured on a shaft H' journaled in brackets I secured to the outer ends of the spindle F. The extreme outer ends of the shaft H' are preferably made square to permit the operator to apply a suitable wrench, or other tool, for conveniently turning the said shaft so as to rotate the eccentric to impart a longitudinal sliding motion to the clamping bar G to press or release the ends of the paper in the V-shaped end $F^3$ of the recess $F^2$.

On one outer face of the spindle F is secured a ratchet wheel J, engaged by a pawl K fulcrumed on the corresponding disk E and pressed on by a spring K' to hold the pawl in mesh with the ratchet wheel. See Fig. 1. In the same disk E is arranged a cam L, adapted to be turned by applying a suitable tool, the said cam serving to actuate the pawl K so as to move the latter out of mesh with the ratchet wheel J and to hold it in this position at the time the operator desires to rotate the spindle F to remove the sand-paper.

On one side of the slot A' is arranged a guide plate N, extending inwardly into the recess $A^2$ to within a short distance of the periphery of the spindle F, to aid the operator in passing the ends of the paper into the diametrical slot F' in the spindle F.

The operation is as follows: In order to apply the sand-paper, the latter is passed over the elastic lining B and the ends of the paper are passed over the rods D, through the slot A', into the recess $A^2$ and into the diametrical slot F' of the spindle F, which stands in such a position that its slot F' is in alignment with the slot A'. In passing the ends of the paper through the diametrical slot F', the paper readily passes between the walls of the V-shaped end $F^3$ and the point G' of the clamping bar G, as the latter is then in its outermost position, the eccentric standing to the right so as to leave sufficient room between the point and the walls of the end $F^3$ to permit a convenient passage of the paper. The operator then applies a wrench or other suitable tool on the square end of the shaft H' so as to turn the shaft to rotate the eccentric H, which thus causes the clamping bar G to slide longitudinally to move its point G' toward the end F³ so that the paper is securely clamped between the point G' and the walls of the V-shaped end F³ of the guideway F². The eccentric moves nearly into an outermost position, and when further turning of the eccentric is prevented by the point G' securely clamping the paper in place, then a further turning of the tool applied on the shaft H' will cause the spindle F to revolve in its bearings in the disks E so that the paper commences to wind on the said spindle within the recess A². As both ends of the paper are securely clamped within the spindle, a uniform pull is exerted on both ends of the paper to draw the latter tightly upon the elastic lining B. As soon as the operator releases or removes the tool applied on the shaft H', a return movement of the spindle F is prevented by the pawl K engaging a corresponding tooth of the ratchet wheel J. The eccentric H remains at all times in the position it is left in, by the operator first turning the shaft H'. Thus it will be seen that the paper is first drawn within the spindle F and then wound upon the latter to draw the paper tight on the peripheral lining of the wheel A. In order to release the paper to remove the same from the roll, in case the paper is worn out or for other reasons, the operator first turns the cam L so as to move the pawl K out of mesh with the ratchet wheel J. Then the operator applies a tool on the end of the shaft H' to turn the spindle F in the inverse direction from that previously given, to unwind the paper, and then he actuates the eccentric to shift the bar G to release the paper from the point G' of the said bar.

Having thus described my invention, I claim as new and desire to secure by Letters Patent—

1. A sand-paper wheel, comprising a spindle having a diametrical slot and an interior recess leading into the said slot, and a clamping bar arranged within the said recess and adapted to clamp the paper in place on the walls of the said recess, substantially as shown and described.

2. A sand-paper wheel, comprising a spindle having a diametrical slot and an interior recess having a V-shaped end, a clamping bar arranged within the said recess and provided with a V-shaped point adapted to clamp the paper in place in the V-shaped end of the said recess, and an eccentric mounted to turn in the said bar to shift the latter longitudinally, substantially as shown and described.

3. A sand-paper wheel, comprising a spindle having a diametrical slot and an interior recess having a V-shaped end, a clamping bar arranged within the said recess and provided with a V-shaped point adapted to clamp the paper in place in the V-shaped end of the said recess, an eccentric mounted to turn in the said bar to shift the latter longitudinally, a shaft carrying the said eccentric and journaled in bearings arranged on the said spindle, and means, substantially as described, for retaining the said spindle in position, as set forth.

FREDERICK H. STUBBE.

Witnesses:
THEO. G. HOSTER,
C. SEDGWICK.